(12) United States Patent
Ueno (10) Patent No.: US 8,149,101 B2
(45) Date of Patent: Apr. 3, 2012

(54) DISPLAY DEVICE WITH ANTI-CRIME SECURITY FUNCTION

(75) Inventor: Keizou Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 501 days.

(21) Appl. No.: 12/173,731

(22) Filed: Jul. 15, 2008

(65) Prior Publication Data
US 2009/0109015 A1 Apr. 30, 2009

(30) Foreign Application Priority Data
Oct. 31, 2007 (JP) .................................. 2007-282593

(51) Int. Cl.
*G08B 21/00* (2006.01)
(52) U.S. Cl. ........ 340/506; 340/571; 340/679; 340/680; 348/156
(58) Field of Classification Search .................. 340/506, 340/571, 679, 680; 348/156
See application file for complete search history.

(56) References Cited

U.S. PATENT DOCUMENTS

| | | | | |
|---|---|---|---|---|
| 5,918,060 A | * | 6/1999 | Jeong | 713/324 |
| 6,002,427 A | * | 12/1999 | Kipust | 348/156 |
| 6,665,805 B1 | * | 12/2003 | Tsirkel et al. | 713/323 |
| 7,049,950 B2 | * | 5/2006 | Schmitt et al. | 340/468 |
| 2004/0150618 A1 | * | 8/2004 | Huang | 345/156 |
| 2005/0034147 A1 | * | 2/2005 | Best et al. | 725/10 |

FOREIGN PATENT DOCUMENTS

| | | |
|---|---|---|
| JP | A 5-173663 | 7/1993 |
| JP | A 2006-344099 | 12/2006 |

* cited by examiner

*Primary Examiner* — Daniel Wu
*Assistant Examiner* — Mark Rushing
(74) *Attorney, Agent, or Firm* — Fujitsu Patent Center (57) ABSTRACT

A control unit of a display device controls the display device in a normal mode of operation to operate in a normal state. The control unit controls the display device to enter into an anti-crime security mode of operation, when a state representing that the external information processing device may not be currently used is determined. The control unit cancels the anti-crime security mode of operation, when the information indicative of an authorized user for confirmation has been entered through the operation buttons by a user in the anti-crime security mode of operation. The control unit controls the display device to operate in an alarm mode of operation, when information indicative of the authorized user for confirmation has not been entered by a user in the anti-crime security mode of operation. The control unit performs an alarm operation in the alarm mode of operation.

20 Claims, 9 Drawing Sheets

DISPLAY DEVICE WITH ANTI-CRIME SECURITY FUNCTION

FIELD OF THE INVENTION

The present invention generally relates to a display device having an anti-crime security function, and more particularly, to a display device which can improve anti-crime security of an information processing device connected thereto and can detect an unauthorized person that approaches the information processing device.

BACKGROUND OF THE INVENTION

Currently available conventional anti-crime security systems may involve detection of an open state of a window, detection of an impact caused by breaking a window glass, and detection of an infrared radiation emitted by a person climbing over a wall. In addition, available conventional security functions for personal computers involve prompting a user to enter his or her identification and/or password or to initiate a biometric scan for authentication.

Japanese Patent Application Publication No. HEI 5-173663-A describes an electronic device such as a personal computer. A notebook personal computer includes: a sensor for sensing presence of an object in front of a display device, a timer for measuring time, a control part, a warning speaker and a warning indicator. The control part causes the timer to start measuring time when the sensor senses presence of a VDT user in front of the display device, and causes the timer to stop measuring time. The warning speaker and the warning indicator produce a warning when the timer measures a set time. This controls VDT user's health.

Japanese Patent Application Publication No. 2006-344099-A describes a method of preventing an unauthorized use of a personal computer. According to this method, a built-in camera automatically captures an image of a face of an operator under the control of a camera control part when an openable/closable visual display panel is opened for activation. The captured image data is stored in a storage device, and transmitted by a captured image data transmission part to a server on a network via a network interface.

SUMMARY OF THE INVENTION

In accordance with an aspect with the present invention, a display device includes a display unit which displays images represented by displaying video signals received from an external information processing device, a detector which detects an ambient environment condition, a memory which stores information indicative of an authorized user, operation buttons, and a control unit. The control unit controls the display device in a normal mode of operation to operate in a normal state according to an information signal from the external information processing device. The control unit controls the display device to enter into an anti-crime security mode of operation, when a state representing that the external information processing device may not be currently used is determined. The control unit cancels the anti-crime security mode of operation, when it is determined that information indicative of the authorized user for confirmation has been entered through the operation buttons by a user in the anti-crime security mode of operation. The control unit controls the display device to operate in an alarm mode of operation, when information indicative of the authorized user for confirmation has not been entered by a user in the anti-crime security mode of operation. The control unit performs an alarm operation in the alarm mode of operation.

In accordance with another aspect with the present invention, the control unit controls the display device to enter into an anti-crime security mode of operation, when a state representing that the external information processing device may not be currently used is detected by the detector. The control unit cancels the anti-crime security mode of operation, when it receives information indicative of the authorized user from the external information processing device in the anti-crime security mode of operation. The control unit controls the display device to enter into an alarm mode of operation, when it does not receive information indicative of the authorized user from the external information processing device in the anti-crime security mode of operation.

BRIEF DESCRIPTION OF THE DRAWINGS

FIG. 8 is an example of a flow chart for a process, which is executed by the display device when a power supply of the display device is turned on.

DESCRIPTION OF THE PREFERRED EMBODIMENTS

Many conventional anti-crime security systems include a sensor and a monitoring camera at the boundary between a security area and an outside area. In such systems, an unpermitted or unauthorized person may get into the security area while keeping away from a sensing range of the sensor and a view field of the monitoring camera.

The inventor has recognized that the reliability of an anti-crime security system can be enhanced by providing a sensor at an unexpected position inside the security area and by securely operating the sensor.

An object of the present invention is to provide a display device having a reliable anti-crime security function.

According to the invention, a display device can provide a reliable anti-crime security function.

The invention will be described in connection with non-limiting embodiments with reference to the accompanying drawings. Throughout the drawings, similar symbols and numerals indicate similar items and functions.

Figure 1:
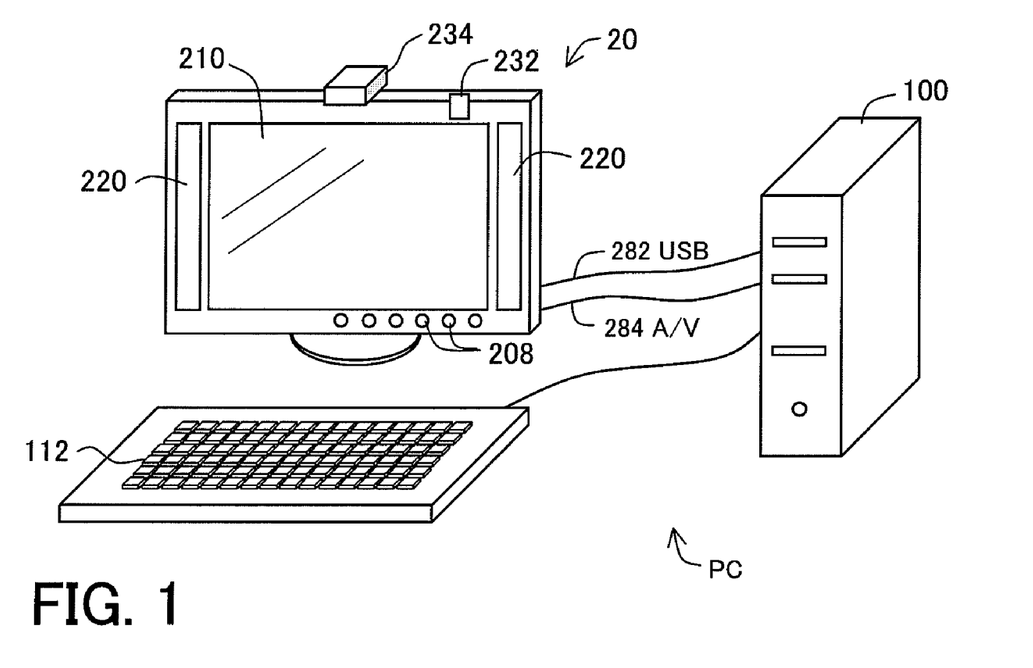
FIG. 1 shows a schematic arrangement of a personal computer (PC) as an information processing device that includes a main body of the personal computer, a display device and a keyboard, in accordance with an embodiment of the present invention.

FIG. 1 shows a schematic arrangement of a personal computer PC as an information processing device that includes a main body 100 of the personal computer PC, a display device 20 and a keyboard 112, in accordance with an embodiment of the present invention. The display device 20 is connected to the PC main body 100 via a USB cable 282 and an audio/video (A/V) signal cable 284.

The display device 20 has operation buttons 208 usually used for adjusting items, such as sound volume and screen brightness, and for displaying corresponding OSDs (on-screen displays), a liquid crystal display panel unit (LCD) 210, a pair of right and left speakers (SPKs) 220, a brightness sensor 232, and an infrared (IR) human sensor 234.

Figure 2:
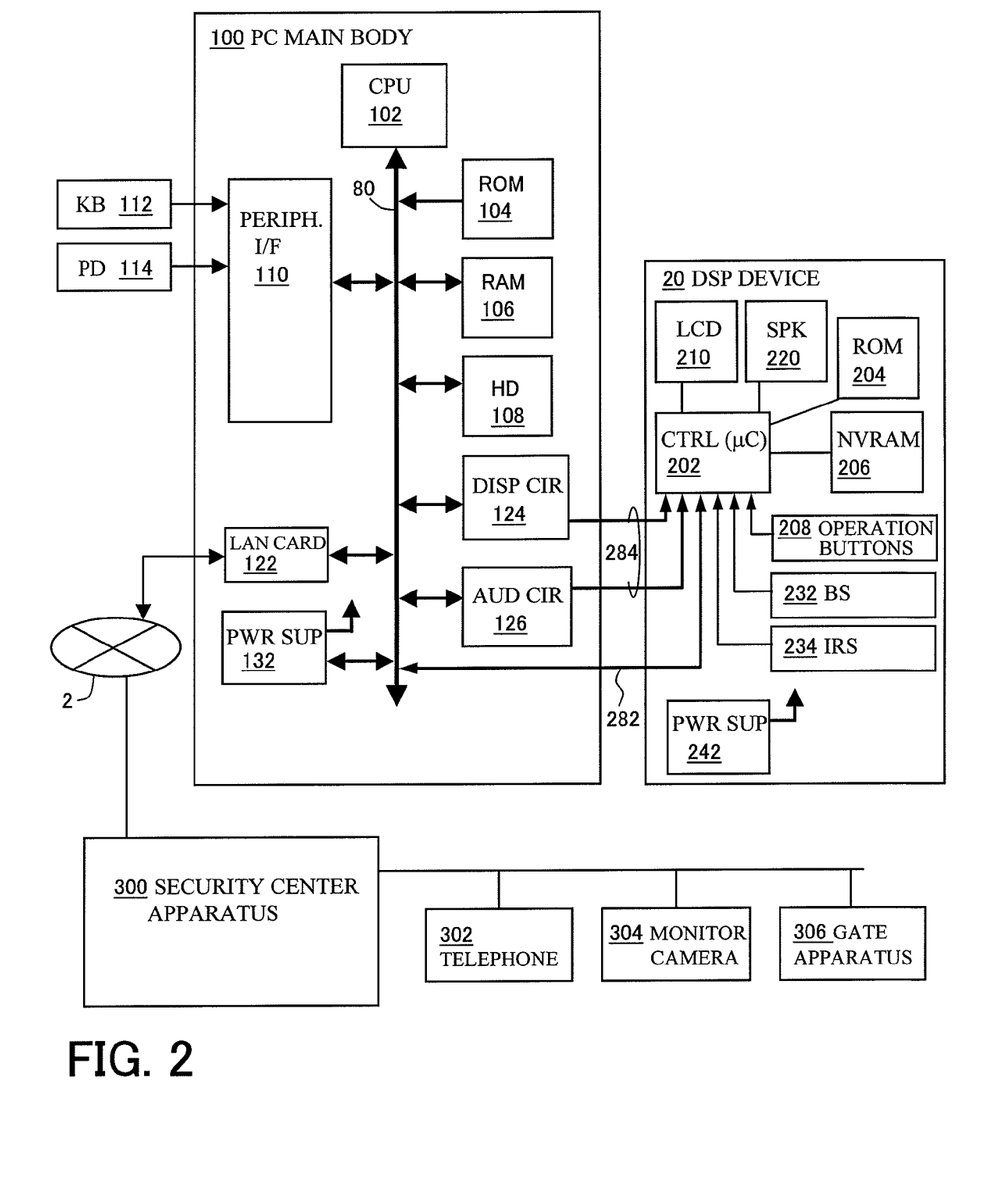
FIG. 2 shows the schematic configurations of a personal computer (PC) main body and a display device, in accordance with the embodiment of the invention.

FIG. 2 shows the schematic configurations of the personal computer (PC) main body 100 and the display device 20, in accordance with the embodiment of the invention. The PC main body 100 includes a CPU 102, a ROM 104, a RAM 106, a hard disk drive 108, a peripheral interface 110, a LAN card 122 connected to a LAN 2, a display circuit 124, an audio output circuit 126 and a power supply circuit 132, all of which are interconnected via an internal bus 80.

In addition to the operation buttons 208, the liquid crystal display panel unit (LCD) 210, the speakers (SPK) 220, the brightness sensor (BS) 232 and the infrared human sensor (IRS) 234, the display device 20 has a ROM 204, an NVRAM (non-volatile RAM) 206 and a control unit 202 coupled to the elements 204 to 234, and possibly a power supply circuit 242. The control unit 202 may be formed of a microcomputer (μC) used to provide a scaler function and the like.

The ROM 204 stores programs for use with the control unit 202. The programs include programs for anti-crime security operations and alarm functions. The NVRAM 206 stores different setting values, user secret codes or passwords, and particular setting values for the alarm functions in an alarm mode of operation.

Via the USB cable 282, a wakeup command, a lock command, a request command for displaying a password entry screen, a command for cancelling or disabling an alarm operation, and the like are transmitted from the display device 20 to the PC main body 100. Via the USB cable 282, further commands from the PC main body 100 are transmitted to the display device 20.

The operation buttons 208 are used for displaying the OSDs (on-screen displays) on liquid crystal display panel unit 210 of the display device 20 and for entering a user registration password and a confirmation or authentication password, and also used for various entry operations in an anti-crime security mode of operation and the alarm mode of operation. The operation buttons 208 may include, for example, a first button of "AUTO/EXIT", a second button of "−", a third button of "+", a fourth button of "ENTER/MENU", and a fifth button of "PRWON".

Under the control of the control unit 202, the liquid crystal display panel unit (LCD) 210 visually displays images represented by video signals received via the A/V signal cable 284 and also displays screens (e.g., a password entry screen) required in the anti-crime security mode of operation and the alarm mode of operation.

Under the control of the control unit 202, the speakers 220 convert audio signals received via the A/V signal cable 284 into audible sounds for emission, and are used to emit predetermined event or notification sounds (e.g., alarm sound) in the anti-crime security mode of operation and the alarm mode of operation.

The brightness sensor 232 senses or detects the brightness in the ambient area of the display device 20, and converts the detected brightness into a voltage to provide to the control unit 202. The IR human sensor 234 senses or detects the infrared rays radiated from an object or human located in front of the display device 20, measures the distance from the sensor to the object, and converts the measured distance into a voltage to provide to the control unit 202. The detection range, such as the detection angle, of the IR human sensor 234 can be adjusted by the control unit 202 according to a user's operation.

The peripheral interface 110 is coupled to peripheral devices, such as the keyboard (KB) 112, a mouse and/or a pointing device 114.

The PC main body 100 may be connected to a security center apparatus 300 via the LAN card 122 and the LAN 2.

The display circuit 124, which is coupled to the display device 20, supplies video signals to the liquid crystal display panel unit 210 of the display device 20 via the A/V signal cable 284 and the control unit 202 under the control of the CPU 102. The audio output circuit 126, which is coupled to the display device 20, supplies audio signals to the speakers 220 via the A/V signal cable 284 and the control unit 202 under the control of the CPU 102.

The elements 102 to 126 and the like of the PC main body 100, and the elements 202 to 234 and the like of the display device 20 are activated in response to the control signals received from the CPU 102 and the like, and receive power supplied from the power supply circuit 132 and the power supply circuit 242 respectively, which can be controlled in accordance with the control signals from the CPU 102.

The control unit 202 operates in accordance with the programs stored in the ROM 204, and determines the presence or absence of a human and/or the distance from a human in a predetermined range in accordance with the output values from the brightness sensor 232 and the IR human sensor 234, to thereby change images displayed on the liquid crystal display panel unit 210 and also change sounds emitted by the speakers 220.

The security center apparatus 300 is connected via a LAN to a telephone 302, a monitoring camera 304, a gate apparatus 306, speakers, and the like.

Figure 3:
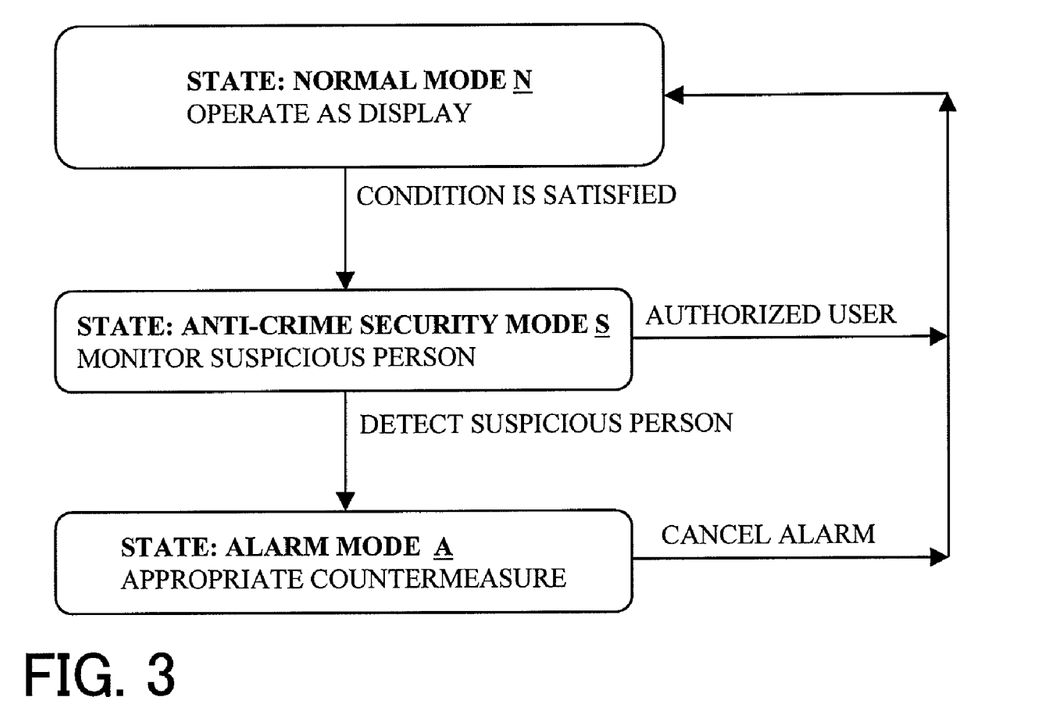
FIG. 3 is a schematic state transition diagram illustrating state transitions between three modes of operation of the display device.

FIG. 3 is a schematic state transition diagram illustrating state transitions between the three modes of operation N, S and A of the display device 20.

In FIG. 3, the display device 20 operates as a display for the PC main body 100 in a state of a normal mode of operation N. If the detected values from the brightness sensor 232 and the IR human sensor 234 satisfy predetermined conditions, the display device 20 enters into a state of the anti-crime security mode of operation S, and monitors an object detected as a tentatively or hypothetically suspicious person.

If the tentatively suspicious person has performed a required correct operation, in the state of the anti-crime security mode of operation S, which operation indicates that the person is an authorized user, then the display device 20 returns to the state of the normal mode of operation N. If the tentatively suspicious person has not performed the required correct operation in the state of anti-crime security mode of operation S, then the display device 20 enters into the alarm mode of operation A, and operates to produce an alarm indicating that a suspicious or unauthorized person has been detected. If the tentatively suspicious person has performed the required correct operation in the state of the alarm mode of operation A, which operation indicates that the person is an authorized user, then the display device 20 enters into the state of the normal mode of operation N, and operates to cancel or disable the alarm operation.

Figure 4:
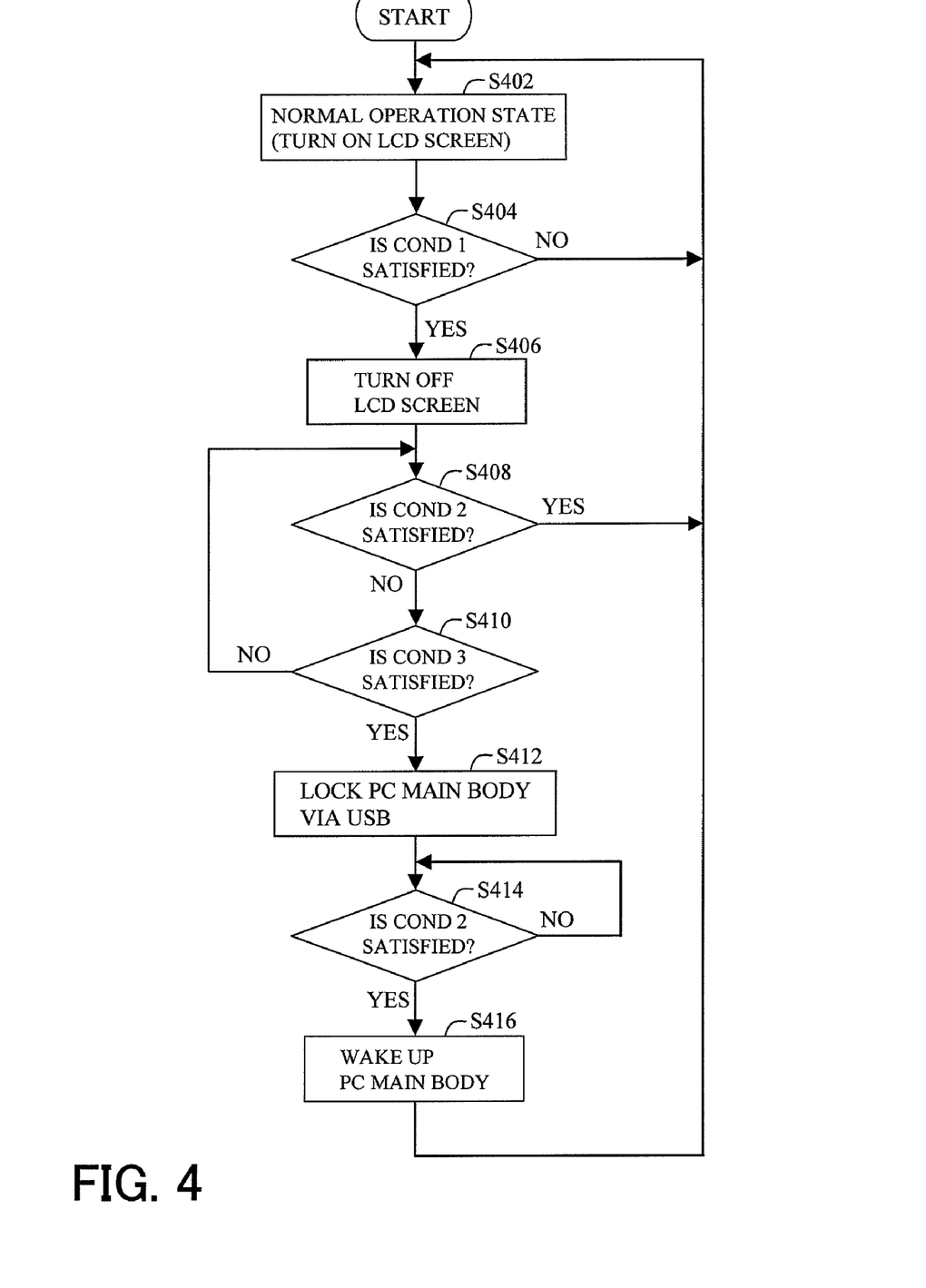
FIG. 4 shows a flow chart for controlling the display device and the PC main body in accordance with a detected value from an IR human sensor in the normal mode of operation.

FIG. 4 shows a flow chart for controlling the display device 20 and the PC main body 100 in accordance with the detected value from the IR human sensor 234 in the normal mode of operation N.

Referring to FIG. 4, at Step 402, the display device 20 is in the normal operation state, and hence it turns on the liquid crystal display panel unit (LCD) 210, i.e. the LCD screen, displays images represented by video signals from the PC main body 100, and also produces desired sounds represented by audio signals from the PC main body 100 through the speakers 220. At Step 404, the control unit 202 determines whether condition 1 is satisfied. Condition 1 may be, for example, that the potential of the IR human sensor 234 is a predetermined value (e.g., 1.3 V) or less, or that the potential of the IR human sensor 234 continues to be at the predetermined value (e.g., 1.3 V) or less for a predetermined period of time (e.g., 10 seconds) or more.

If it is determined at Step 404 that condition 1 is not satisfied, the procedure returns to Step 402. If it is determined at Step 404 that condition 1 is satisfied, the control unit 202 at Step 406 turns off the liquid crystal display panel unit 210 (the LCD screen) and the speakers 220. This allows the display device 20 or the control unit 202 to save electric power, and to prevent an unauthorized person from looking into the screen of the liquid crystal display panel unit 210.

At Step 408, the control unit 202 determines whether condition 2 is satisfied. Condition 2 may be, for example, that the output potential of the IR human sensor 234 is higher than the predetermined value (e.g., 1.3 V).

If it is determined at Step 408 that condition 2 is satisfied, the procedure returns to Step 402. If it is determined at Step 408 that condition 2 is not satisfied, the control unit 202 determines at Step 410 whether condition 3 is satisfied. Condition 3 may be, for example, that the function of locking the operation of the PC main body 100 is deactivated or disabled and also a predetermined period of time (e.g., one minute) has elapsed after the turn off of the liquid crystal display panel unit 210.

If it is determined at Step 410 that condition 3 is not satisfied, the procedure returns to Step 408. If it is determined at Step 410 that condition 3 is satisfied, the control unit 202 at Step 412 transmits, to the PC main body 100 via the USB cable 282, a signal for request for locking of the PC main body 100.

At Step 414, the control unit 202 determines whether condition 2 is satisfied. If it is determined at Step 414 that condition 2 is not satisfied, the procedure returns to Step 414. Thus, Step 414 is repeated until condition 2 is satisfied.

If it is determined at Step 414 that condition 2 is satisfied, the control unit 202 at Step 416 wakes up or activates the PC main body 100 via the USB cable 282. The process of Steps 406 to 416 provides electric power saving, and prevents an unauthorized person from looking into the screen of the liquid crystal display panel unit 210. After that, the procedure returns to Step 402.

Figure 5:
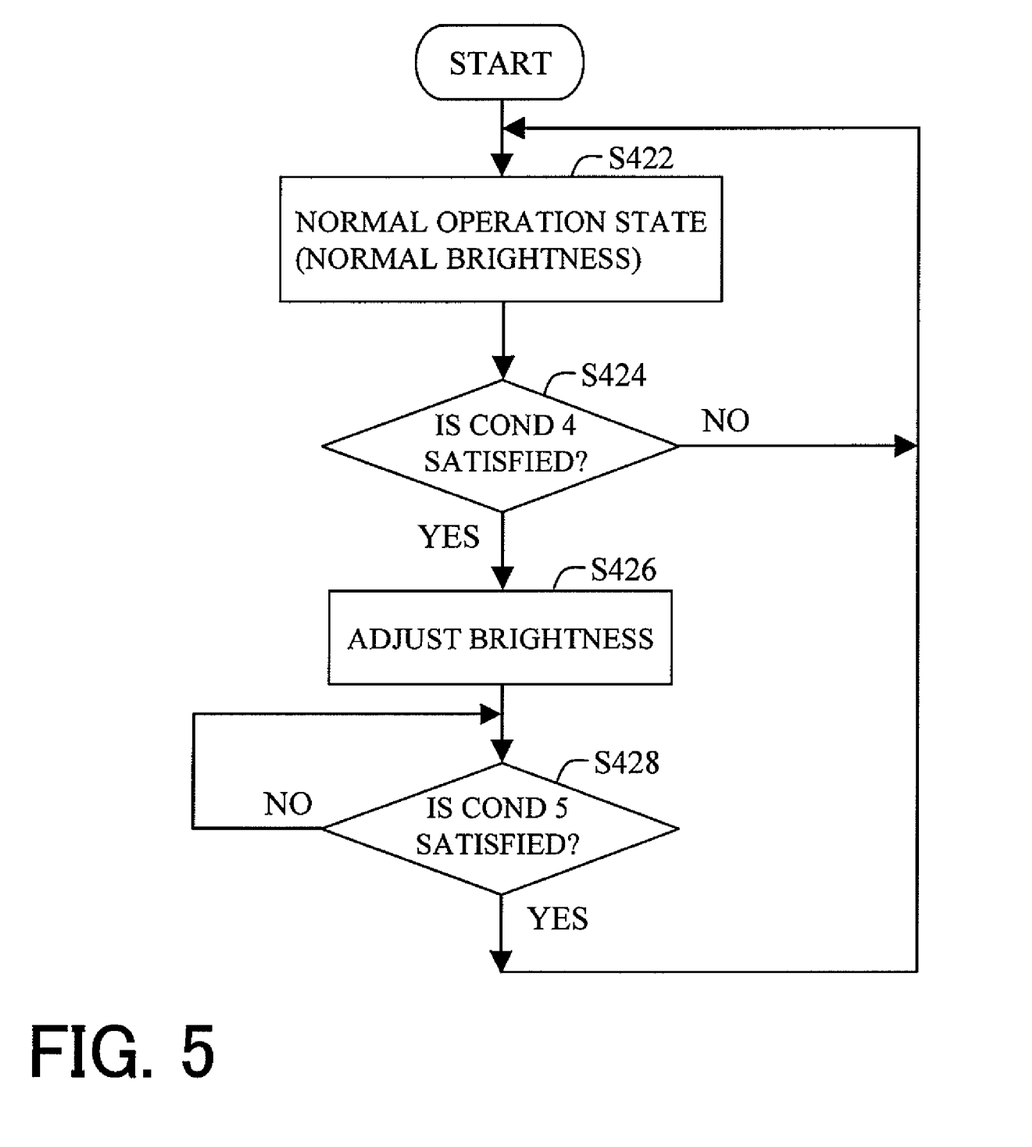
FIG. 5 shows a flow chart for controlling the display device in accordance with the detection by a brightness sensor, in the normal mode of operation.

FIG. 5 shows a flow chart for controlling the display device 20 in accordance with the detection by the brightness sensor 232, in the normal mode of operation N.

Referring to FIG. 5, at Step 422, the display device 20 is in the normal operation state, and turns on the liquid crystal display panel unit 210 for displaying images represented by video signals from the PC main body 100, and produces a desired sound through the speakers 220. At Step 424, the control unit 202 determines whether condition 4 is satisfied. Condition 4 may be, for example, that the potential or the brightness of the brightness sensor 232 in the ambient area of the display device 20 has reduced to a first predetermined value (e.g., 2 V) or less or has exceeded or increased to higher than the first predetermined value (e.g., 2 V).

If it is determined at Step 424 that condition 4 is not satisfied, the procedure returns to Step 422. If it is determined at Step 424 that condition 4 is satisfied, the control unit 202 at Step 426 controls or adjusts the brightness of the liquid crystal display panel unit 210 in accordance with the potential of the IR human sensor 234, i.e. the brightness in the ambient area. For example, if condition 4 is that the potential of the IR human sensor 234 is a first predetermined value or less, then the control unit 202 lowers the brightness of the liquid crystal display panel unit 210 to a predetermined level. For example, if condition 4 is that the potential of the IR human sensor 234 is higher than the first predetermined value, then the control unit 202 raises the brightness of the liquid crystal display panel unit 210 to a predetermined level.

Next, the control unit 202 at Step 428 determines whether condition 5 is satisfied. Condition 5 may be, for example, that the potential of the brightness sensor 232, i.e. the brightness in the ambient area of the display device 20 is higher than or raised to a value higher than a second predetermined value (e.g., 2.1 V), or that the potential or the brightness of the brightness sensor 232 is not higher than or is lowered to the second predetermined value (e.g., 1.9 V) or less.

The procedure repeats Step 428 unless condition 5 is satisfied at Step 428. If it is determined at step 428 that condition 5 is satisfied, the procedure returns to Step 422. The process of Steps 422 to 428 provides proper control or adjustment of the brightness of the liquid crystal device panel unit 210 depending on the brightness in the ambient area of the display device 20. When the ambient area is brighter than the threshold, the brightness of the liquid crystal device panel unit 210 is raised, and when the ambient area is darker than the threshold, the brightness of the liquid crystal device panel unit 210 is lowered, so that the brightness of the liquid crystal device panel unit 210 is adjusted to desirable or optimal brightness.

Figure 6:
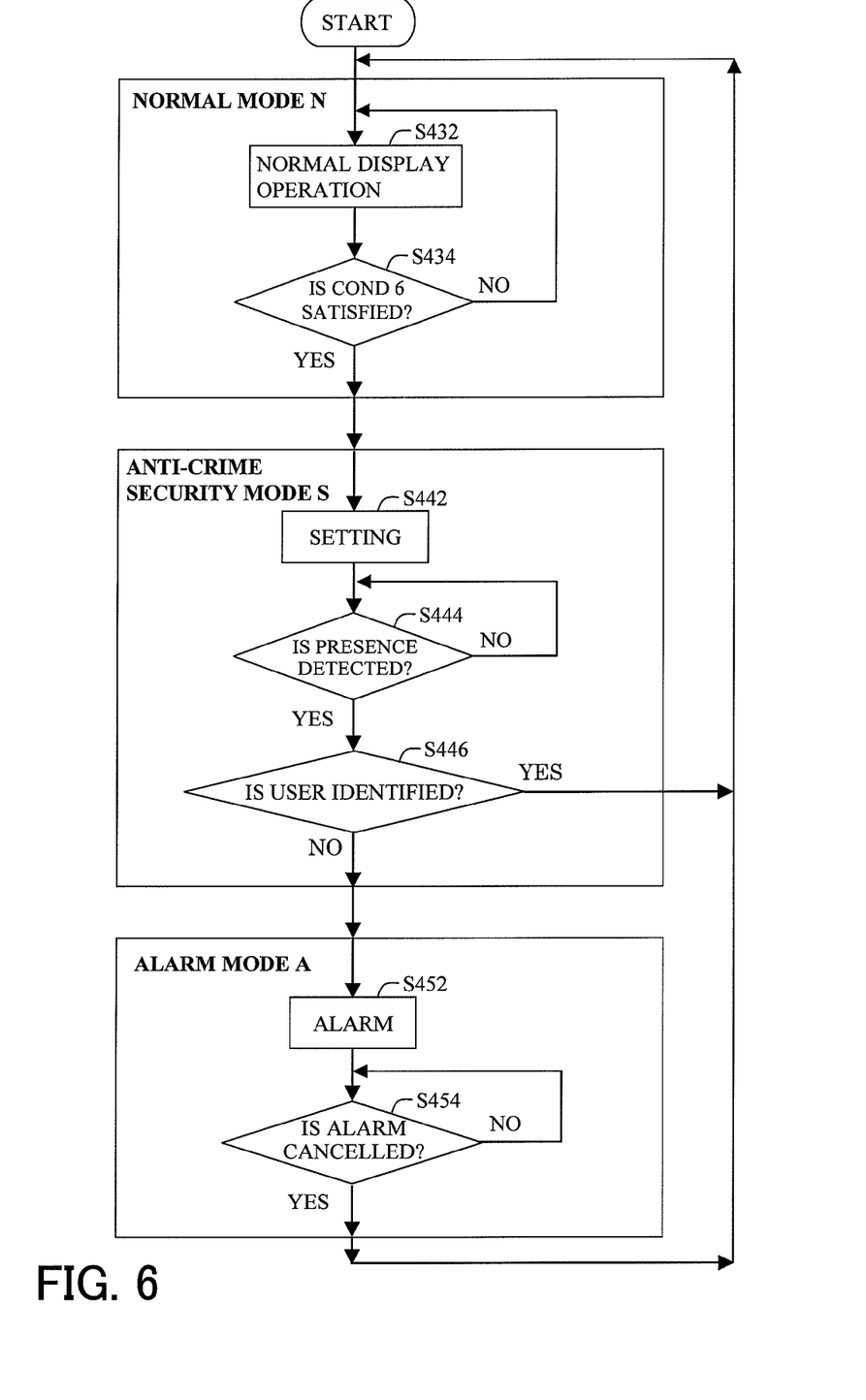
FIG. 6 is a flowchart for processes in the modes of operation, which is executed by the display device.

FIG. 6 is a flow chart for processes in the modes of operation N, S and A, which is executed by the display device 20.

Referring to FIG. 6, at Step 432, the control unit 202 controls the display device 20 to operate in the normal mode of operation N, so that the display device 20 operates as the display device for the PC main body 100. At Step 434, the control unit 202 determines whether condition 6 is satisfied. Condition 6 may be, for example, that the user has pressed the operation buttons to thereby change the display mode or the operation mode on the OSD. Condition 6 may be that a state representing high likelihood that the PC main body 100 is not currently used is determined or detected, for example, that the control unit 202 determines that no video signal is received from the PC main body 100 for longer than a predetermined period of time, that no one is detected by the IR human sensor 234 for longer than a predetermined period of time, and/or that the brightness in the ambient area or the room detected by the brightness sensor 232 remain to have a predetermined threshold value or lower for longer than a predetermined period of time.

If it is determined at Step 434 that condition 6 is not satisfied, the procedure returns to Step 432. If it is determined at Step 434 that condition 6 is satisfied, the control unit 202 controls the display device 20 to operate in the anti-crime security mode of operation S. At Step 442, the control unit 202 performs predetermined settings in the display device 20. The predetermined settings may include, for example, control of the detected output voltage level of the IR human sensor 234 to be amplified and raised, control of the detected threshold value for the IR human sensor 234 to be lowered, i.e. the sensitivity to be raised, and control of the detection range (e.g., the wide-angle system or swivel control) of the IR human sensor 234 to be widened.

At Step 444, the control unit 202 determines whether presence of a human has been detected by the IR human sensor 234. Step 444 is repeated until presence of a human is detected. If it is determined that presence of a human has been detected by the IR human sensor 234, the control unit 202 determines at Step 446 whether it has been confirmed that the user is identified an authorized user.

Confirmation of an authorized user may be performed by determining, for example, that the user has performed a predetermined special operation of the operation buttons 208 for input within a predetermined period of time in a manner to indicate that he or she is an authorized user, or that the user has properly pressed the operation buttons 208 in the OSD displayed by the control unit 202 on the liquid crystal display panel unit 210 so as to enter a correct identification code representing an authorized user. The predetermined special operation of the operation buttons 208 for input may be, for example, that the second and fourth buttons of the five operation buttons are kept being pressed down simultaneously for three seconds or more in the state of user confirmation OSD. Alternatively, confirmation of an authorized user may be performed, for example, by the control unit 202 such that the control unit 202 communicates with the PC main body 100 via the USB cable 282 or short-range wireless communication (e.g., the Bluetooth Standard or the wireless LAN Standard), thereby wakes up the PC main body 100 and requests the PC main body 100 for a command for displaying a password entry screen, then displays the password entry screen on the liquid crystal display panel unit 210 in response to the command from the PC main body 100 to thereby prompt the user to enter a password on the password entry screen via the keyboard 112 or the like, and then receives a signal indicating that the PC main body 100 has confirmed that the entered password is correct.

If it is determined at Step 446 that the user is identified as an authorized user, the control unit 202 controls the display device 20 to enter into the normal mode of operation N. Then, the procedure returns to Step 432. If it is determined at Step 446 that the user is not identified as an authorized user, the control unit 202 controls the display device 20 to operate in the alarm mode of operation A. Then, the procedure proceeds to Step 452.

At Step 452, the control unit 202 produces a predetermined alarm. The predetermined alarm may be, for example, a temporal alarm sound at the maximum volume generated through the speakers 220, or a screen or character representation, such as "A suspicious person is found!", flashed on the turned on liquid crystal display panel unit 210 or the LCD screen. The predetermined alarm may be further produced by, for example, waking up the PC main body 100 via the USB cable 282 or the like so that its dedicated application provides information indicating "A suspicious person is found", its location and the like to the security center apparatus 300, the police or the like. In accordance with the information on a suspicious person from the PC main body 100, the security center apparatus 300 may provide an audio alarm to a predetermined telephone 302 for example, or may close the gate 306 such as a fire door through which a suspicious person may pass for example, or may control the monitoring camera 304 in terms of the view direction or the like for example.

At Step 454, the control unit 202 determines whether the alarm operation should be cancelled or disabled, depending on whether a condition for the cancellation is satisfied.

The condition for the cancellation may be, for example, that the user has performed a predetermined special operation of the operation buttons 208 for input in a manner to indicate that he or she is an authorized user, that the user has performed a predetermined special operation of the operation buttons 208 in the OSD displayed by the control unit 202 on the liquid crystal display panel unit 210 so as to enter a correct identification code representing an authorized user, or that the user has performed a predetermined special operation of the operation buttons 208 so as to change the operation mode of the display device 20 from the alarm mode of operation A to the normal mode of operation N. The predetermined special operation of the operation buttons 208 for input may be, for example, that, in the alarm mode of operation A, the second and fourth buttons of the five operation buttons are kept being pressed down simultaneously for two seconds or more, the first button is then released, and only the fourth button is kept pressed down for two seconds or more. Alternatively, the condition for the cancellation may be, for example, that the AC power supply to the PC main body 100 is shut down.

If it is determined at Step 454 that the alarm operation should not be cancelled, Step 454 is repeatedly executed so that the alarm state continues until it is determined that the alarm operation should be cancelled. If it is determined at Step 454 that the alarm operation should be cancelled, the control unit 202 controls the display device 20 to enter into the normal mode of operation N. Then, the procedure returns to Step 432.

Figure 7:
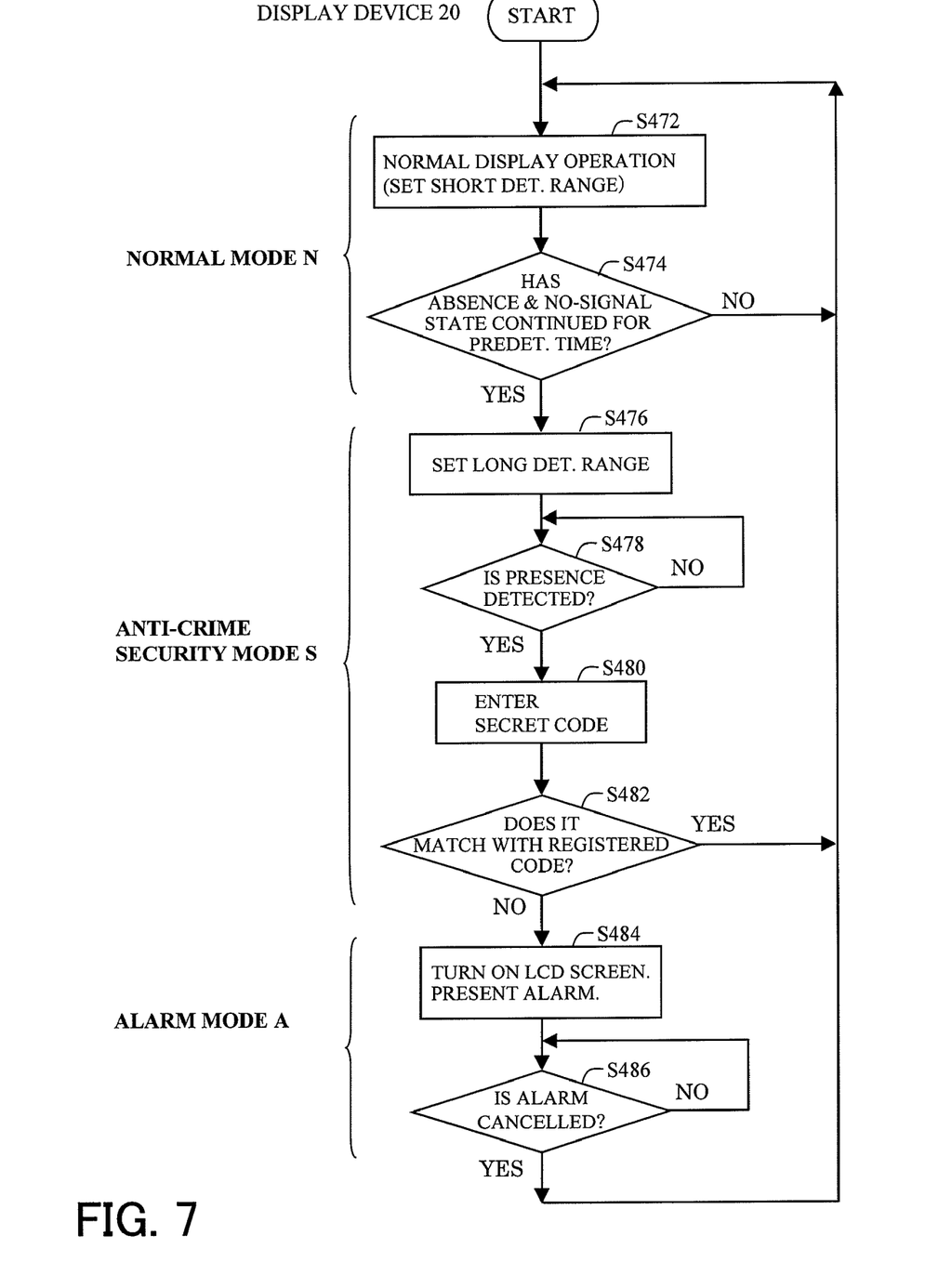
FIG. 7 is an example of a more specific flow chart for processes, which is executed by the display device.

FIG. 7 is an example of a more specific flow chart for processes, which is executed by the display device 20. In this case, the display device 20 is not required to communicate with the PC main body 100 in the anti-crime security mode of operation and the alarm mode of operation, and can operate independently by the power supply from the power supply circuit 242.

Referring to FIG. 7, at Step 472, the control unit 202 controls the display device 20 to operate in the normal mode of operation N, so that the display device 20 operates as a display for the PC main body 100. In this case, the control unit 202 sets the detectable range of the IR human sensor 234 to have a short distance such as a distance of 60 cm. At Step 474, the control unit 202 determines whether a combined state of absence of human detection by the IR human sensor 234 and absence or turn-off of the audio/video signal on the A/V signal cable 284 has continued for more than a predetermined period of time.

If it is determined at Step 474 that the combined state has not continued for more than the predetermined period of time, the procedure returns to Step 472. If it is determined at Step 474 that the combined state has continued for more than the predetermined period of time, the control unit 202 at Step 476 sets the detectable range of the IR human sensor 234 to have a longer distance, such as a distance of 150 cm.

At Step 478, the control unit 202 determines whether presence of a human has been detected by the IR human sensor 234. If it is determined that no one or absence of a human has been detected, the procedure returns to Step 478. Step 478 is repeated until presence of a human is detected. If it is determined that presence of a human has been detected, the control unit 202 at Step 480 displays a secret or identification code entry screen on the liquid crystal display panel unit 210 to prompt the person to enter a secret or identification code.

At Step 482, the control unit 202 determines whether the entered secret code matches with a registered secret code stored in the NVRAM 206. If it is determined that the entered secret code matches with the registered code, the procedure returns to Step 472.

If it is determined at Step 482 that the entered secret code does not match with the registered code, the control unit 202 at Step 484 turns on the liquid crystal display panel unit 210 (the LCD screen), to display an alarm screen such as "A suspicious person is found!" (which is alarm screen information stored in the NVRAM 206) and flashes the backlight at intervals of 0.5 seconds.

At Step 486, the control unit 202 determines whether a further operation for cancelling the alarm operation has been performed thereafter. As an operation for cancelling the alarm operation, for example, the user may operate the display device 20 to display the OSD and then perform required entries by pressing down the operation buttons 208 in the predetermined order in a manner to indicate that he or she is an authorized user.

If it is determined at Step 486 that the operation for cancelling the alarm operation has not been performed, Step 486 is repeatedly executed so that the alarm state continues until it is determined that the alarm cancellation operation has been performed. If it is determined at Step 486 that the alarm cancellation operation has been performed, the control unit 202 controls the display device 20 to enter into the normal mode of operation N. Then the procedure returns to Step 472.

Figure 8:
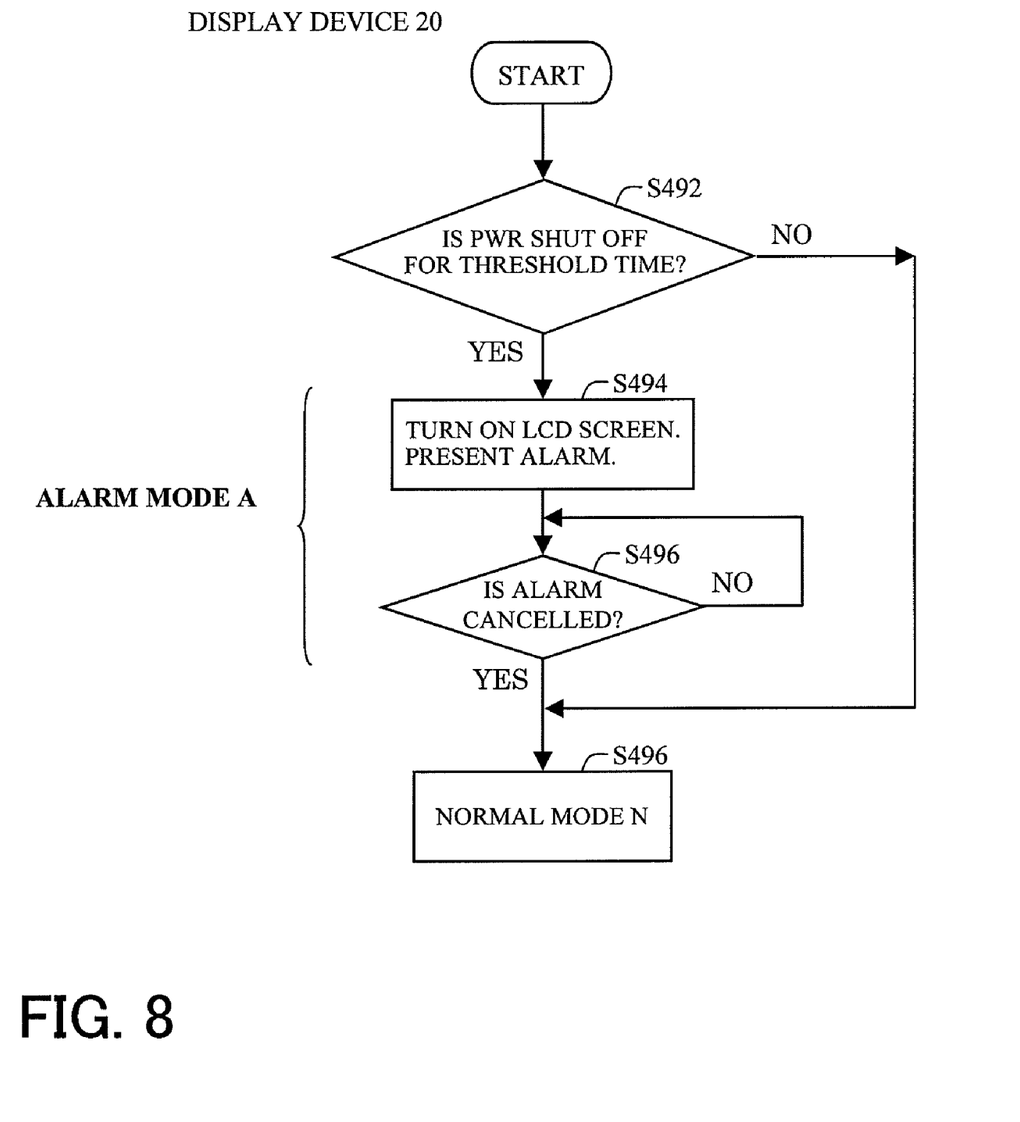

FIG. 8 is an example of a flow chart for a process, which is executed by the display device 20 when the power supply of the display device 20 is turned on.

Referring to FIG. 8, when the display device 20 is powered on, the control unit 202 at Step 492 detects the operation state of the power supply circuit 242 and determines whether the supply of the commercial AC power to the power supply circuit 242 has been shut off for more than a threshold period of time (e.g., five minutes). If it is determined that the supply of the power to the power supply circuit 242 has not been shut off for more than the threshold period of time, the procedure proceeds to Step 494.

If it is determined at Step 492 that the supply of the power to the power supply circuit 242 has been shut off for more than the threshold period of time, the procedure proceeds to the alarm mode of operation A. The control unit 202 at Step 494 turns on the liquid crystal display panel unit 210 or the LCD screen to display an alarm screen such as "Power is shut off by a suspicious person" (which is alarm screen information stored in the NVRAM 206). Thus, even when the supply of the AC power to the power supply circuit 242 of the display device 20 is shut off (e.g., unplugged) by a suspicious person, the occurrence of the power shut-off by a suspicious person can be notified to the user when the AC power is supplied to the display device 20 after the power shut-off.

Step 496 is similar to Step 486 shown in FIG. 7, and hence will not described again. After that, the procedure proceeds to Step 496. At Step 496, the display device 20 enters into the normal mode of operation N.

Figure 9:
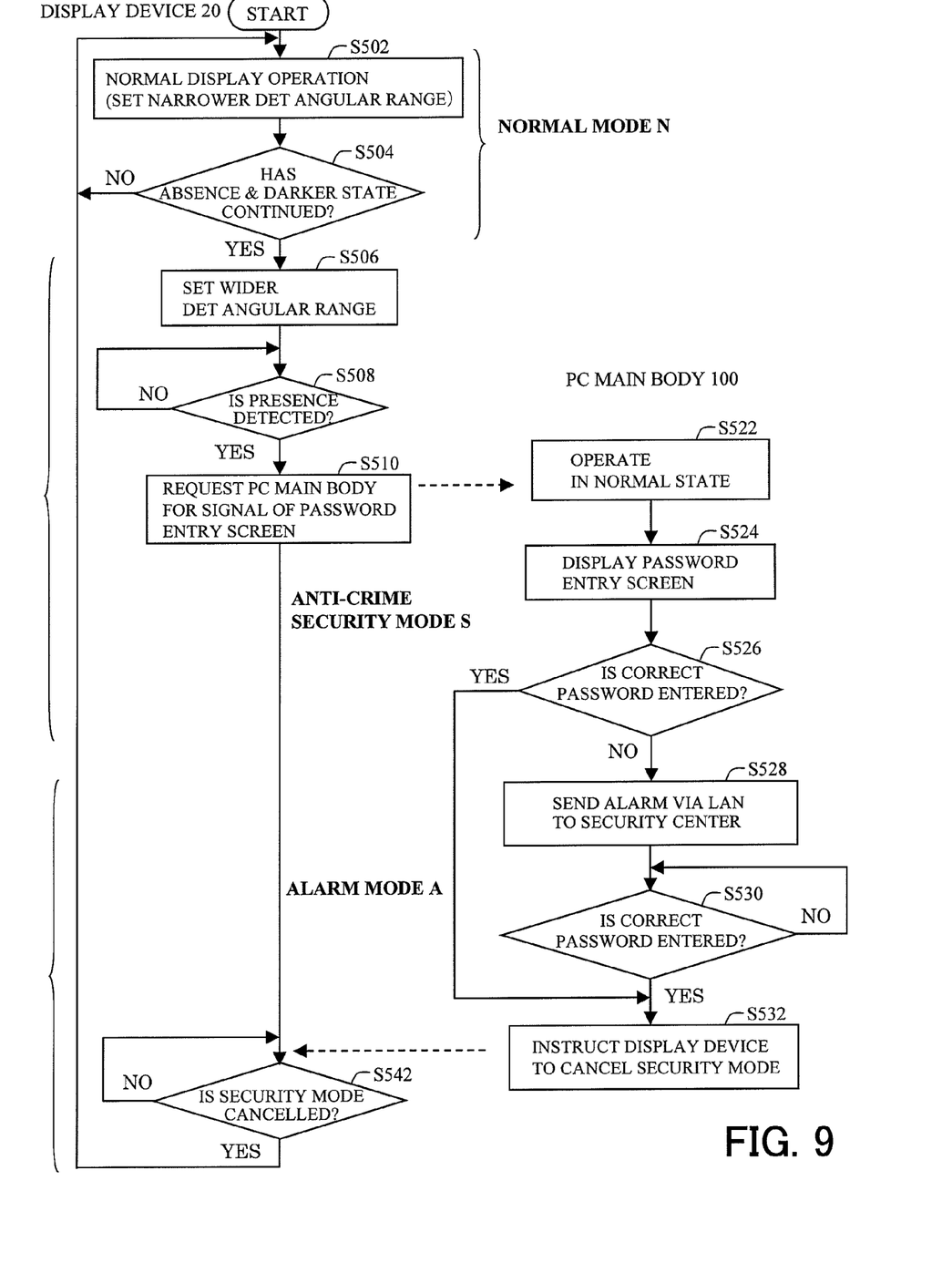
FIG. 9 is an example of a more specific flow chart for processes, which is executed by the display device and the PC main body in cooperation.

FIG. 9 is an example of a more specific flow chart for processes, which is executed by the display device 20 and the PC main body 100 in cooperation with each other. In this case, both of the display device 20 and the PC main body 100 are required to be supplied with power at all times.

Referring to FIG. 9, at Step 502, the control unit 202 of the display device 20 controls the display device 20 to operate in the normal mode of operation N so that the display device 20 operates as a display for the PC main body 100. The control unit 202 sets the detectable range of the IR human sensor 234 to have a narrower angle such as an angle of 90 degrees. At Step 504, the control unit 202 determines whether a combined state of absence of human detection by the IR human sensor 234 and lower brightness detected by the brightness sensor 232 at a predetermined threshold value or lower has continued for more than a predetermined period of time.

If it is determined at Step 504 that the combined state has not continued for more than the predetermined period of time, the procedure returns to Step 502. If it is determined at Step 504 that the combined state has continued for more than the predetermined period of time, the control unit 202 at Step 506 sets the detectable range of the IR human sensor 234 to have a wider angle such as an angle of 160 degrees.

At Step 508, the control unit 202 determines whether presence of a human has been detected by the IR human sensor 234. If it is determined that no one has been detected, Step 508 is repeated until presence of a human is detected. If it is determined that presence of a human has been detected, the control unit 202 at Step 510 requests the PC main body 100 via the USB cable 282 to generate a signal for displaying the password entry screen.

At Step 522, the CPU 102 of the PC main body 100 operates in the normal operation state in response to the request from the display device 20. The CPU 102 wakes up the entirety of the PC main body 100, when the PC main body 100 is in a power saving state. At Step 524, the CPU 102 generates the signal for displaying the password entry screen to thereby display the password entry screen (not shown) on the display device 20. The password may be entered by pressing down the predetermined keys of the keyboard 112 or by displaying the OSD and then pressing down the operation buttons 208. The password may be changed as desired by the user and stored in the NVRAM 206 so that the password can be retrieved from the NVRAM 206 and used for authentication.

At Step 526, the CPU 102 determines whether the user has entered the correct password within a predetermined period of time (e.g., 10 seconds), or determines whether the password matches with the registered password. If it is determined that the correct password has been entered within the predetermined period of time, the procedure proceeds to Step 532.

If it is determined at Step 526 that the correct password has not been entered within the predetermined period of time, the CPU 102 at Step 528 performs an alarm operation, for example, by providing an alarm to the security center apparatus 300 via the LAN 2. At Step 530, the control unit 202 determines whether the user has entered the correct password thereafter or the entered password matches with the registered password. Until the correct password is entered, Step 530 is repeated, so that the alarm state continues.

At Step 532, the CPU 102 provides an instruction for cancelling the anti-crime security mode of operation S, to the display device 20 via the USB cable 282. Then the CPU 102 operates in the normal operation state.

At Step 542, the control unit 202 of the display device 20 determines whether it has received the command for canceling the anti-crime security mode of operation from the PC main body 100. Step 542 is repeated until it receives the instruction for canceling the anti-crime security mode of operation. If it is determined at Step 452 that it has received the instruction for canceling the anti-crime security mode of operation, the procedure returns to Step 502.

According to the above-mentioned embodiments, false detection of a hypothetical intruder in the anti-crime security system can be avoided by the user's operation on the display device or the like, whereby it is not necessary to reduce the sensitivity of the sensors for the anti-crime security. Furthermore, since the display device automatically enters into the anti-crime security mode of operation, the user is not required to positively set the display device so as to operate in the anti-crime security mode of operation. Moreover, the position of an intruder can be located within a relatively small range in accordance with the location of the display device or the PC main body, and hence the anti-crime security system can take an appropriate countermeasure against the intruder. Still further, since the sensors disposed on the display device also serve as anti-crime security sensors, an intruder can be detected without the intruder recognizing the detection.

In the embodiments, it is desirable that the power supply states of the commercial power to the display device 20 and the PC main body 100 are monitored by the security center apparatus 300. With this monitoring, when the power supplies of the commercial AC power to the display device 20 and the PC main body 100 are shut off by a suspicious person, the shut-off can be detected and an alarm can be issued.

In the embodiments shown in FIGS. 6 to 8, any desired forms of the anti-crime security mode of operation S and the alarm mode of operation A shown in FIGS. 6 to 8 can be selectively combined with the normal mode of operation N.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. A display device comprising:
a display unit which displays images represented by video signals received from an external information processing device external to the display device;
a detector which detects an ambient environment condition;
a memory which stores information indicative of an authorized user;
operation buttons for on-screen display;
a power supply; and
a control unit coupled to the display unit, the detector, the memory, and the operation buttons which are in the display device, wherein,
when the display device is powered on and then the control unit determines that power to the power supply has been shut off for longer than a threshold period of time, the control unit controls the display device to operate in an alarm mode of operation before the control unit determines whether information indicative of the authorized user is entered,
the control unit controls the display device in a normal mode of operation to operate in a normal state according to an information signal from the external information processing device,
the control unit controls the display device to enter into an anti-crime security mode of operation, when a state representing that the external information processing device may not be currently used is determined,
the control unit cancels the anti-crime security mode of operation, when the control unit determines that information indicative of the authorized user for confirmation has been entered through the operation buttons for on-screen display by a user in the anti-crime security mode of operation,
the control unit controls the display device to operate in the alarm mode of operation, when the control unit determines that information indicative of the authorized user for confirmation has not been entered by a user in the anti-crime security mode of operation, and
the control unit performs an alarm operation in the alarm mode of operation.

2. The display device according to claim 1, wherein the detector is a human sensor, and
the control unit controls the display device to enter into the anti-crime security mode of operation, when it is determined that absence of a human has been detected by the human sensor.

3. The display device according to claim 2, wherein the control unit cancels the alarm mode of operation, when the information indicative of an authorized user has been entered through the operation buttons by a user in the alarm mode of operation.

4. The display device according to claim 1, wherein the detector is a brightness sensor, and
the control unit controls the display device to enter into the anti-crime security mode of operation, when it is determined that ambient brightness detected by the brightness sensor is lower than a threshold.

5. The display device according to claim 4, wherein the control unit cancels the alarm mode of operation, when the information indicative of an authorized user has been entered through the operation buttons by a user in the alarm mode of operation.

6. The display device according to claim 1, wherein the control unit controls the display device to enter into the anti-crime security mode of operation, when it is determined that no video signal has been received from the external information processing device.

7. The display device according to claim 1, wherein the control unit raises a detection sensitivity of the detector as a human sensor in the anti-crime security mode of operation.

8. The display device according to claim 1, wherein the control unit produces a visual or audio alarm on the display unit in the alarm mode of operation.

9. The display device according to claim 1, wherein the control unit cancels the alarm mode of operation, when the information indicative of an authorized user has been entered through the operation buttons by a user in the alarm mode of operation.

10. The display device according to claim 1, wherein the external information processing device is a main body of a personal computer.

11. A display device comprising:
a display unit which displays images represented by video signals received from an external information processing device external to the display device;
a detector which detects an ambient environment condition;
a memory which stores information indicative of an authorized user;
operation buttons for on-screen display;
a power supply; and
a control unit coupled to the display unit, the detector, the memory, and the operation buttons which are in the display device, wherein,
when the display device is powered on and then the control unit determines that power to the power supply has been shut off for longer than a threshold period of time, the control unit controls the display device to operate in an alarm mode of operation before the control unit determines whether information indicative of the authorized user is entered,
the control unit controls the display device in a normal mode of operation to operate in a normal state according to an information signal from the external information processing device,
the control unit controls the display device to enter into an anti-crime security mode of operation, when a state representing that the external information processing device may not be currently used is detected by the detector, the control unit cancels the anti-crime security mode of operation, when the control unit receives information indicative of the authorized user from the external information processing device in the anti-crime security mode of operation, the control unit controls the display device to enter into the alarm mode of operation, when the control unit does not receive information indicative of the authorized user from the external information processing device in the anti-crime security mode of operation, and the control unit performs an alarm operation in the alarm mode of operation.

12. The display device according to claim 11, wherein the detector is a human sensor, and the control unit controls the display device to enter into the anti-crime security mode of operation, when it is determined that absence of a human has been detected by the human sensor.

13. The display device according to claim 12, wherein the control unit cancels the alarm mode of operation, when the control unit receives the information indicative of an authorized user from the external information processing device in the alarm mode of operation.

14. The display device according to claim 11, wherein the detector is a brightness sensor, and the control unit controls the display device to enter into the anti-crime security mode of operation, when it is determined that ambient brightness detected by the brightness sensor is lower than a threshold.

15. The display device according to claim 14, wherein the control unit cancels the alarm mode of operation, when the control unit receives the information indicative of an authorized user from the external information processing device in the alarm mode of operation.

16. The display device according to claim 11, wherein the control unit controls the display device to enter into the anti-crime security mode of operation, when it is determined that no video signal has been received from the external information processing device.

17. The display device according to claim 11, wherein the control unit raises a detection sensitivity of the detector as a human sensor in the anti-crime security mode of operation.

18. The display device according to claim 11, wherein the control unit produces a visual or audio alarm on the display unit in the alarm mode of operation.

19. The display device according to claim 11, wherein the control unit cancels the alarm mode of operation, when the control unit receives the information indicative of an authorized user from the external information processing device in the alarm mode of operation.

20. The display device according to claim 11, wherein the external information processing device is a main body of a personal computer.

* * * * *